(12) United States Patent
Hori et al.

(10) Patent No.: US 7,174,055 B2
(45) Date of Patent: Feb. 6, 2007

(54) IMAGE INFORMATION DESCRIBING METHOD, VIDEO RETRIEVAL METHOD, VIDEO REPRODUCING METHOD, AND VIDEO REPRODUCING APPARATUS

(75) Inventors: Osamu Hori, Yokohama (JP); Toshimitsu Kaneko, Yokohama (JP); Takeshi Mita, Yokohama (JP); Koji Yamamoto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/963,582

(22) Filed: Oct. 14, 2004

(65) Prior Publication Data

US 2005/0047681 A1 Mar. 3, 2005

Related U.S. Application Data

(62) Division of application No. 09/493,012, filed on Jan. 28, 2000, now Pat. No. 6,912,327.

(30) Foreign Application Priority Data

Jan. 28, 1999 (JP) ................. 11-020386

(51) Int. Cl.
*G06K 9/54* (2006.01)
*G06K 9/60* (2006.01)
*G06F 7/00* (2006.01)
*G06F 17/00* (2006.01)

(52) U.S. Cl. .............. 382/305; 358/403; 707/104.1; 348/231.2; 715/716; 725/37

(58) Field of Classification Search ............... 382/305; 358/403; 707/104.1; 348/231.2; 715/716–726; 725/37–61
See application file for complete search history.

(56) References Cited

U.S. PATENT DOCUMENTS

| | | | |
|---|---|---|---|
| 3,723,644 A | 3/1973 | Haskell et al. | |
| 5,732,146 A | 3/1998 | Yamada et al. | |
| 5,819,301 A * | 10/1998 | Rowe et al. | ............... 715/513 |
| 5,995,707 A | 11/1999 | Lee | |
| 6,154,771 A | 11/2000 | Rangan et al. | |
| 6,166,735 A | 12/2000 | Dom et al. | |
| 6,275,829 B1 | 8/2001 | Angiulo et al. | |
| 6,301,586 B1 * | 10/2001 | Yang et al. | ............... 707/104.1 |
| 6,307,550 B1 | 10/2001 | Chen et al. | |
| 6,357,042 B2 | 3/2002 | Srinivasan et al. | |
| 6,374,260 B1 | 4/2002 | Hoffert et al. | |
| 6,389,421 B1 * | 5/2002 | Hawkins et al. | ............... 707/10 |
| 6,400,378 B1 * | 6/2002 | Snook | ............... 715/716 |
| 6,427,032 B1 * | 7/2002 | Irons et al. | ............... 382/306 |
| 6,449,608 B1 | 9/2002 | Morita et al. | |
| 6,496,206 B1 * | 12/2002 | Mernyk et al. | ............... 715/835 |
| 6,598,054 B2 * | 7/2003 | Schuetze et al. | ........ 707/103 R |
| 6,810,404 B1 * | 10/2004 | Ferguson et al. | ........... 707/200 |

FOREIGN PATENT DOCUMENTS

| | | |
|---|---|---|
| EP | 0 619 550 A2 | 10/1994 |
| EP | 0 633 693 | 1/1995 |
| EP | 0 676 898 | 10/1995 |
| EP | 0 689 364 | 12/1995 |
| EP | 0 782 085 | 7/1997 |
| FR | 2 758 428 | 7/1998 |

OTHER PUBLICATIONS

Yeo, Boon-Lock and Liu, B. A Unified Approach to Temporal Segmentation of Motion JPEG and MPEG Compressed Video. May 1995. Multimedia Computing and Systems, 1995., Proceedings of the Internation Conference on May 15-18, 1005. pp. 81-88.

Y. Tonomura, et al., Journal of Visual Languages and Computing, vol. 1, pp. 183-198, XP-000195706, "Content Oriented Visual Interface Using Video Icons for Visual Database Systems", 1990.

M. Mills, et al., Proceedings of the Conference on Human Factors in Computing Systems, pp. 93-98, XP-000426811, "A Magnifier Tool for Video Data", May 3, 1992..

Y. Nakaiima, et al., IEICE Transactions on Information and Systems, vol. E77-D, No. 12, pp. 1355-1364, XP-000497103, "A Video Browsing Using Fast Scene Cut Detection for an Efficient Networked Video Database Access", Dec. 1, 1994.

N. Dimitrova, et al., Proceedings of the 6th International Conference on Information and Knowledge Management, vol. Conf. 6, pp. 113-120, XP-000775302, "Video Keyframe Extraction and Filtering: a Keyframe is not a Keyframe to Everyone", Nov. 10, 1997.

Hong Jiang Zhang, et al., "Content-Based Video Browsing Tools", Proceedings of the SPIE, vol. 2417, XP-000571808, Feb. 6, 1995, pp. 389-398.

* cited by examiner

*Primary Examiner*—Jingge Wu
*Assistant Examiner*—Aaron Carter
(74) *Attorney, Agent, or Firm*—Oblon, Spivak, McClelland, Maier & Neustadt, P.C.

(57) ABSTRACT

Video frames of original video data are sampled with arbitrary time interval and size, and thumbnail frames are obtained. As thumbnail information concerning these frames, information on frame number of the original video frame corresponding each of the thumbnail frames and size of each thumbnail frame are described. Further, scene change information on the original video frames or intra-frame frame change value information are described altogether as additional information, and temporal/spatial thumbnail meta-data is obtained. The meta-data is associated with original video data, and a database is constructed. Then, the meta-data is employed, thereby performing typical frame display of original video data or variable speed reproduction. In this manner, even with a device with its low CPU capability, typical frame display or variable speed reproduction is performed for compressed and encoded video data such as MPEG-2, and the contents of video is checked, and retrieval is easily performed.

6 Claims, 11 Drawing Sheets

THUMBNAIL INFORMATION
· FRAME NUMBER OR TIME OF ORIGINAL VIDEO DATA
· SIZE (HEIGHT×WIDTH)
· NUMBER OF FRAMES (ORIGINAL VIDEO DATA) OR TIME UNTIL NEXT FRAME
· IMAGE FORMAT (JPEG, RGB, YUV ETC.)
· THUMBNAIL DATA (OR POINTER FOR ORIGINAL IMAGE DATA)

IMAGE INFORMATION DESCRIBING METHOD, VIDEO RETRIEVAL METHOD, VIDEO REPRODUCING METHOD, AND VIDEO REPRODUCING APPARATUS

CROSS-REFERENCE TO RELATED APPLICATION

This application is a divisional of U.S. application Ser. No. 09/493,012 filed Jan. 28, 2000, now U.S. Pat. No. 6,912,327 and is based upon and claims the benefit of priority from the prior Japanese Patent Application No. 11-020386, filed Jan. 28, 1999; the entire contents of each of which are incorporated herein by reference.

BACKGROUND OF THE INVENTION

The present invention relates to a method of describing image information. In particular, the present invention relates to a method of describing thumbnail information on thumbnail frames which are obtained by sampling video frames with arbitrary time intervals and in spatially arbitrary size, and video retrieval and video reproducing methods and apparatus employing the thumbnail information.

In recent years, with advancement of semiconductor technology and digital signal processing technology, it has been possible to perform processing for converting moving image (video) information from analog data to digital data and compressing the digital data in real time. Actually, in digital satellite broadcasting, digital video data compressed and encoded by MPEG-2 that is the international standard for moving picture image compression is distributed, and the compressed video data is decompressed and decoded at each home in real time so that cinemas or the like can be watched by means of a television receiver.

In addition, with achievement of a high-density optical disk, a technology for recording digital video data compressed by MPEG-2 or the like is becoming at a practical stage. A typical example of such optical disk medium includes DVD-RAM or CD-RW. Although a recording time is shorter than that of DVD-RAM, it is also possible to record digital video data in HDD. Further, it is considered that digital video data recorded in the DVD-RAM or the like is required so as to easily retrieve as in digitized texts or still picture data.

A classical technique for video retrieval is that a title name and a keyword are defined for each video file such as cinema, and are retrieved based on one or both of the title name and keyword. This method is disadvantage in that retrieval itself is easy, but detailed retrieval according to the content of a video cannot be done, and whether or not a predetermined video is obtained cannot be identified as long as the video is actually reproduced and displayed.

In recording the compressed digital video data, the moving video image can be handled as continuity of still image frames. Thus, a method for selecting and listing a characteristic image frame called a typical frame from an original video by means of an image processing technology is considered. As a typical frame, a frame called scene change at which a scene is switched may be often employed. However, such scene change does not occur once per several seconds, occasionally once per some tens of seconds, and thus, there is a limitation to expressing the content of the video at the typical frame. If an attempt is made to check contents of frames between scene changes, the original video data must be decoded and displayed.

The digital video data compressed in accordance with the international standards such as MPEG-1 and MPEG-2 includes a mechanism for random access to a certain extent so that variable speed reproduction (trick play) such as fast reproduction can be performed. However, these variable speed reproductions are heavy in processing because they are performed by manipulating digital video data itself, and a burden upon processing is increased in a receiving device for home use with its small computer power. In addition, as in browser in video on demand or Internet, when variable speed reproduction is performed in environment such that digital video data is distributed from a server installed at a remote site through a network, and the distributed data is received by a computer or a television receiver at home, there is difficulty that a network traffic is increased.

As described above, a conventionally general video retrieval is such that information is retrieved based on a title name or a keyword assigned to a video file, and in reality, environment in which the content of a video is checked and retrieved is not sufficiently provided.

In addition, there is a problem that a method for selecting a portion of scene change from an original video as a typical frame and listing the typical frame is incapable of checking contents of video frames between scene changes.

Further, in a mechanism for variable speed reproduction incorporated in the international standard for moving image compression such as MPEG-1 or MPEG-2, variable speed reproduction is performed by manipulating digital video data itself. Thus, a burden upon processing is increased in a small-sized device with its computer power. In addition, when an attempt is made to perform variable speed reproduction in the environment such that digital video data distributed through a network is received, there has been a problem that a network traffic is increased.

BRIEF SUMMARY OF THE INVENTION

Accordingly, it is a main object of the present invention to provide an image information describing method capable of performing retrieving or displaying a video while checking the content of a video.

A related object of the present invention is to enable proper video retrieving even when a target frame exists between scene changes.

A further object of the present invention is to reduce a throughput in the case of performing variable speed reproduction of a video so that the variable speed production can be easily achieved by a device with its small computer power or on a network.

To achieve the foregoing objects, there is provided an image information describing method according to the present invention, wherein attribute information for specifying a video frame corresponding to each of thumbnail frames is described as thumbnail information concerning the thumbnail frame obtained by sampling the video frames with arbitrary time interval and size.

Further, in addition to such attribute information, additional information corresponding to the video frame is described.

The attribute information includes either or both of position information indicative of a position on a time axis of the video frame corresponding to the thumbnail frame and size information concerning a size of the thumbnail frame.

The additional information includes either or both of scene change position information on the video frame and information on a frame change value between the video frames.

The thumbnail information may be described together with the thumbnail frame or a pointer for the video frame corresponding to the thumbnail frame.

In addition, according to the present invention, a storage medium is provided in which the thumbnail information only or the thumbnail information with the additional information described by the above image information describing method is stored together with image data of the video frame or separated from the image data.

Further, according to the present invention, the thumbnail information only or the thumbnail information with the additional information described by the above mentioned image information describing method is employed, making it possible to provide video retrieval or video reproduction based on the thumbnail frames as described below.

That is, according to a first video retrieval method/apparatus, at least first positions on a time axis of the video frames corresponding to the thumbnail frames are described as the thumbnail information concerning the thumbnail frames obtained by sampling the video frames with arbitrary time interval and size, a second position on the time axis of a target video frame is specified, and a thumbnail frame having the first position that is the closest to the second position is retrieved based on the first positions and the second position.

Thus, the thumbnail information described according to the present invention is employed, thereby making it possible to easily perform the video retrieval of a predetermined frame without any burden on a computer power or traffic.

According to another video retrieval method/apparatus, at least first positions on a time axis of the video frames corresponding to the thumbnail frames are described as the thumbnail information concerning the thumbnail frames obtained by sampling the video frames with arbitrary time interval and size, a scene change position on the time axis of the video frames is further described as additional information, a second position on the time axis of a target video frame is specified, and a thumbnail frame having the first position that is the closest to the second position which is earlier or later than the scene change position is retrieved according to a time relationship between the second position and the scene change position that is the closest thereto, based on the first positions, the second position, and the scene change position.

More specifically, the scene change position that is the closest to the target frame is detected, it is determined as to whether or not the target frame exists earlier or later than the scene change position, in the former case, the video frame that is the closest to the target frame and earlier than the scene change position is retrieved; and in the latter case, the video frame that is the closest to the target frame and later than the scene change position is retrieved.

Thus, the scene change position is described as the additional information, thereby making it possible to retrieve a thumbnail frame more similar to the target frame.

According to still another video retrieval method/apparatus, at least positions on a time axis of the video frame corresponding to each of thumbnail frames are described as thumbnail information concerning the thumbnail frames obtained by sampling the video frames at arbitrary groups with respect to time and in spatially arbitrary size, a target image for retrieval is specified, and a thumbnail frame which has the difference between the target image equal to or less than a predetermined threshold is retrieved. In this case, position information described for the thumbnail frame which has the difference between the target image equal to or less than the predetermined threshold may be recorded as the retrieval result.

Thus, a difference between the target image and each of the thumbnail frames, for example, a total of the absolute value differences is obtained, and a thumbnail frame in which this value is minimum is retrieved, thereby making it possible to retrieve a predetermined frame.

According to a video reproducing method/apparatus, at least positions on a time axis of video frames corresponding to thumbnail frames are described as thumbnail information concerning the thumbnail frames obtained by sampling the video frames with arbitrary time intervals and in spatially arbitrary size, information on a frame change value between two video frames is described as additional information, and acquired positions of the thumbnail frames are changed according to information on the frame change value by employing the thumbnail frames, thereby performing variable speed reproduction of video.

That is, a reproduction speed is made slower where a frame change value is large, and the reproduction speed is made higher where the frame change value is small, thereby making it possible to achieve visible variable speed reproduction for the thumbnail frames while the frame change value is maintained constantly.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a video retrieving system according to the present invention will now be described with reference to the accompanying drawings.

First Embodiment

Figure 1:
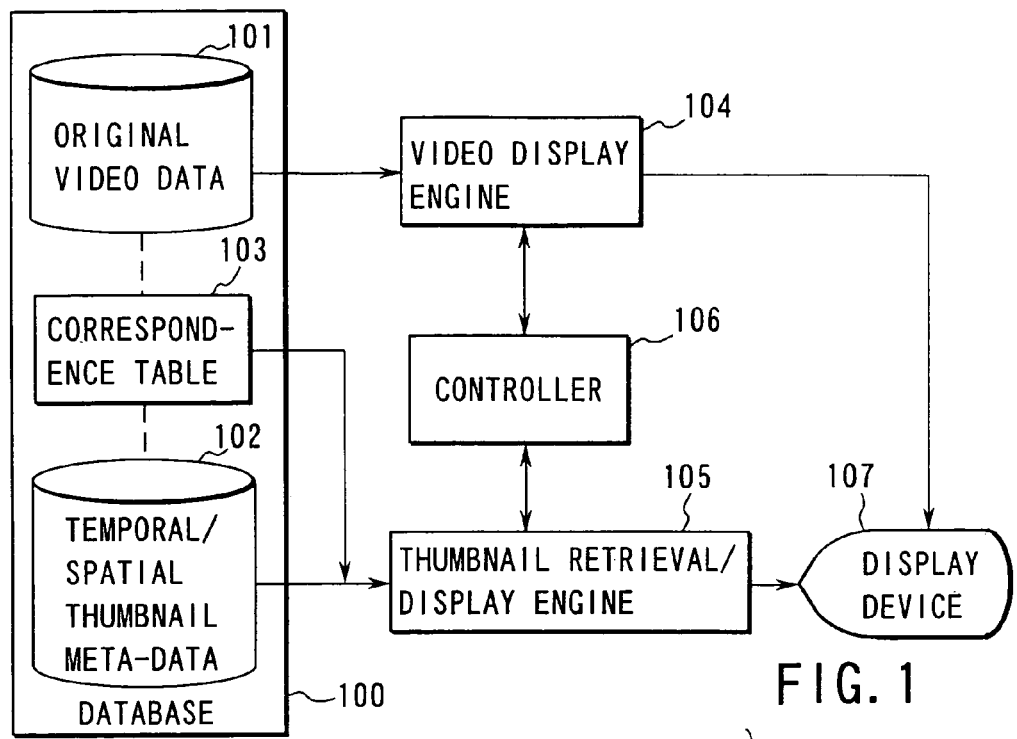
FIG. 1 is a view showing a system architecture according to one embodiment of the present invention.

FIG. 1 shows a system architecture according to the first embodiment of the present invention. This system roughly comprises a database 100, a video display engine 104, a thumbnail retrieval/display engine 105, a controller 106, and a display device 107. The content of the database 100 includes three components; an original video data 101 described later in detail, a temporal/spatial thumbnail meta-data 102, and a correspondence table 103 having both of these data correspond to each other (a correspondence function table may be employed.).

The database 100 may be intensively disposed at one site or may be disposed to be dispersed at a plurality of sites. In short, it is desirable that data can be accessed by the video display engine 104 or the thumbnail retrieval/display engine 105. The original video data 101 and the temporal/spatial thumbnail meta-data 102 may be stored in separate media or may be stored in the same medium. As a medium, DVD or the like is employed. In addition, the original video data 101 may be data transmitted via a network without being stored in one medium.

The video display engine 104 performs processing for displaying the original video data 101 on the display device 107 under the control of the controller 106. Further, the video display engine 104 performs processing for displaying a retrieved part of the original video data 101 on the display device 107 when the original video data 101 is retrieved by the thumbnail retrieval/display engine 105 based on the temporal/spatial thumbnail meta-data 102.

The thumbnail retrieval/display engine 105 retrieves proper thumbnail frames in the vicinity of a predetermined frame of the original video data 101 from the temporal/spatial thumbnail meta-data 102 described later in detail under the control of the controller 106, displays these thumbnail frames as typical frames on the display device 107, and performs retrieval of the original video data 101 via the controller 106 using the temporal/spatial thumbnail meta-data 102.

A difference between the thumbnail retrieval/display engine 105 and the video display engine 104 will be described. The former processes thumbnail frames included in the temporal/spatial thumbnail meta-data 102 with its small capacitance, and thus, a sufficient processing speed can be obtained even if the engine is installed as software on a personal computer with low capacity incorporated in a receiving device.

The latter processes MPEG-2 video data or original video data 101 that is analog video data, and thus, it is often required to install special hardware. Specifically, when the original video data 101 is video data compressed by MPEG-2, a special decode board (a MPEG-2 decoder) is employed for the video display engine 104. In addition, when the original video data 101 is analog video data, a video reproduction device such as VTR capable of controlling fast forwarding and rewinding is employed as the video display engine 104.

If the original video data 101 is video data compressed by MPEG-1 or MPEG-4, it is possible to install the video display engine 104 as software on a personal computer, and it is not required to separate it as a system architecture.

A vertical line connection in the correspondence table 103 is conceptual, and it is not required for the correspondence table 103 to be physically connected to the original video data 101 and the temporal/spatial thumbnail meta-data 102. Therefore, a medium having the original video data 101 stored therein may be stored in the same mainframe as the video display engine 104. In addition, a medium having the temporal/spatial thumbnail meta-data 102 stored therein may be stored in the same mainframe as the thumbnail retrieval/display engine 105.

Even if the medium having the temporal/spatial thumbnail meta-data 102 stored therein and the thumbnail retrieval/display engine 105 exist at a position distant from each other, a 10 Mbps network with relatively small transmission capacity, for example will suffice as a line for connecting both of these medium and engine to each other. On the other hand, a line connecting the medium having the original video data 101 stored therein and the video display engine 104 to each other is required to have capacity of 100 Mbps or more depending on medium type.

A system architecture as shown in FIG. 1 is advantageous in that retrieval is based on the temporal/spatial thumbnail meta-data 102 with smaller data size instead of being based on the original video data 101, thus making it possible to comfortably perform interactive operation and reduce the entire traffic.

Figure 2:
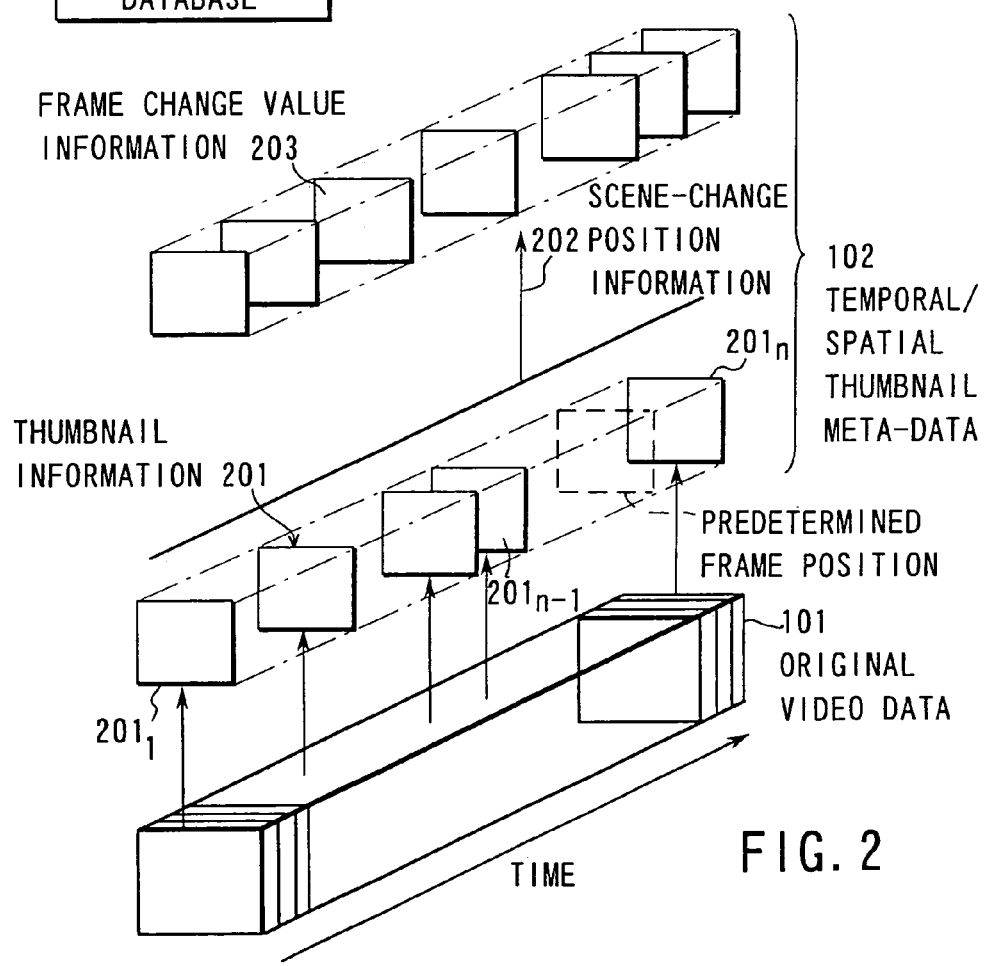
FIG. 2 is a conceptual view showing a structure of original video data and temporal/spatial thumbnail meta-data.

FIG. 2 is a conceptual view of the original video data 101 and the temporal/spatial thumbnail meta-data 102. The original video data 101 is digital video data or analog data compressed by MPEG-1, MPEG-2, MPEG-4 or the like, and includes a group of video frames constituting moving images (a video frame group). In addition, position information indicative of a position on the time axis of each video frame, for example, position information called media time (hereinafter, simply referred to as "time") or frame number is associated with the original video data 101. The original video data 101 is associated with temporal/spatial thumbnail meta-data 102 by time or frame number using the correspondence table 103.

The temporal/spatial thumbnail meta-data 102 includes thumbnail information $201_1$ to $201_n$. Further, in the present embodiment, scene change position information 202 and frame change value information 203 are included in the temporal/spatial thumbnail meta-data 102 as additional information.

The thumbnail information $201_1$ to $201_n$ includes thumbnail frames obtained by sampling video frames constituting original video data 101 with arbitrary time intervals and in spatially arbitrary size, position information (time or frame number) indicative of a position on the time axis of the original video frame corresponding to each of the thumbnail frames, and attribute information for specifying the thumbnail frames such as size information indicative of the size of the thumbnail frame. Of these items the of attribute information, the former, i.e., position information (time or frame number) indicative of a position on the time axis of the original video frame corresponding to each thumbnail frame is described, referring to the correspondence table 103.

As with digital video data having the original video data 101 compressed, when the data has already been digitized, the thumbnail frames in the thumbnail information $201_1$ to $201_n$ of the temporal/spatial thumbnail meta-data 102 are created by decoding or partially decoding a predetermined frame of the original video data 101. If the original video data 101 is analog data, thumbnail frames may be created after the analog data has been digitized.

Now, with respect to a case in which the original video data 101 is video data compressed by MPEG-2, the former of the attribute information, i.e., position information (time or frame number) indicative of a position on the time axis of the original video frame corresponding to each thumbnail frame will be described. In this case, the original video data 101 that is video data compressed by MPEG-2 is decoded, and the thumbnail frames $201_1$ to $201_n$ are created by one piece for 30 frames while the size is reduced by a ratio of 1/8. In addition, instead of thus creating the thumbnail frames by fixed time sampling and fixed spatial sampling, the thumbnail frames can also be created by properly changing these samplings. Where a frame change value is small, it is effective to perform coarse sampling in time direction. In addition, where a frame change value is large, it is effective to perform fine sampling in time direction.

For the video data compressed by MPEG-2, the frames compressed by employing only a correlation within a frame called I picture (encoded within frame) intermittently exist. The I picture is not compressed by employing a correlation between frames unlike P picture (encoded using forward predictive frame) or B picture (encoded using bidirectional predictive frames), and thus, decoding is easy. Thus, when the thumbnail frames are created, only the I pictures of the original video data 101, and moreover, only DC components of the DCT (discrete cosine conversion) coefficients of the I pictures are decoded, thereby making it possible to obtain the temporal/spatial thumbnail frames more easily.

It is not always ensured that the I picture exists with certain frame intervals, however, a method employing the I picture is effective to create the temporal/spatial thumbnail frames from the video data compressed by MPEG-2 with a speed more than a video rate.

A method for creating the thumbnail frames from the I picture is small in processing quantity. Thus, there is an advantage that, even if special hardware is not employed, processing is enabled by only software on a personal computer. In addition, when the thumbnail frames are created from the original video data 101 via a network, the I picture is employed, thereby making it possible to easily avoid an problem such as an increased traffic.

On the other hand, the sampling in spatial direction of the original video data 101 when the thumbnail frames are created does not need to be fixed, and can be variable as required. Occasionally, the thumbnail frames may be expanded for a particularly important screen frame as well as being reduced. As described above, the thumbnail information 201 includes the thumbnail frames and the attribute information on the thumbnail frames. The attribute information includes size information on the thumbnail frames. Thus, the thumbnail frames can be employed after they have been changed to a predetermined size as required during retrieval or display.

Figures 3, 4:
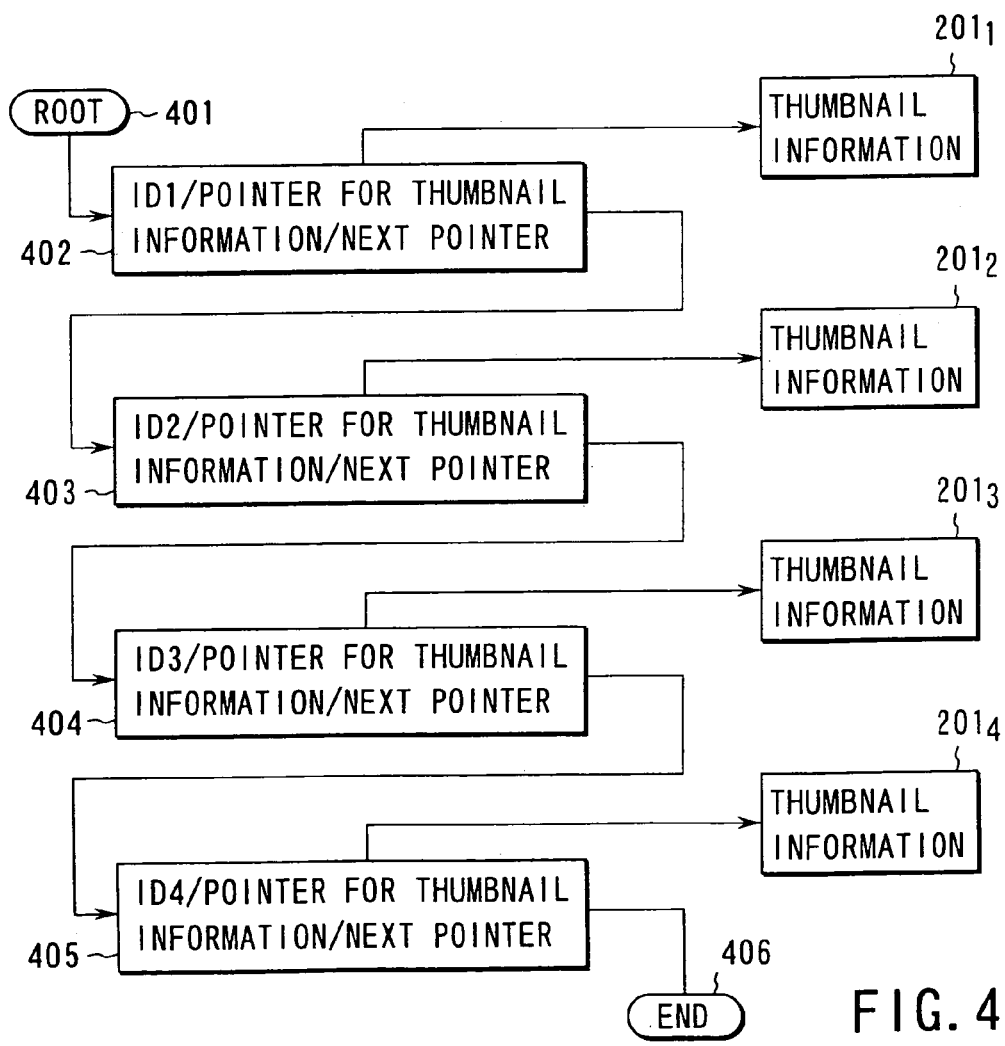
FIG. 3 is an illustrative view of thumbnail information contained in temporal/spatial thumbnail meta-data.
FIG. 4 is a view showing a management structure of the thumbnail information.

FIG. 3 shows a specific description example of the thumbnail information 201. The thumbnail information is described by each frame of the thumbnail frames. In this example, the information includes: (1) frame number or time of original video data corresponding to the thumbnail frame; (2) size of the thumbnail frame (height×width); (3) the number of frames of the original video data or time until the next thumbnail frame; (4) image format of the thumbnail such as JPEG, RGB, and YUV; and (5) image data of the thumbnail (or pointer for the original video data 101). Here, (3), (4), and (5) are not essential, and any of these may be omitted. In addition, additional information other than (1) to (5) may be further contained.

The thumbnail frames are handled as video data having continuous frames with respect to time (thumbnail video described later). The video data is compressed into an AVI file or a MPEG-4 file, for example, thereby making it possible to ensure further compactness. In that case, the video data is directed to a file pointer for the video frame of the original video data 101 and a frame number. Therefore, an interface for acquiring an image of an arbitrary frame from the video data is required.

FIG. 4 shows a management structure of meta-data 102. In this example, a list structure is utilized to manage thumbnail frame $201_1$, $201_2$, ... $202_n$. From "root" 401, lists 402, 403, 404, ... and 405 to be pointers for the thumbnail frame $201_1$, $202_2$, ... $202_n$ are connected in ascending order of frame numbers, and "end" 406 is set as a final flag. ID1, ID2, ID3, ... and ID4 of lists 402, 403, 404, ... and 405 are conceptual, and means that these lists 402, 403, 404, and 405 are arranged in order. In this example, a pointer indicative of where actual thumbnail frame $201_1$, $201_2$, $202_3$, ... and $202_4$ exist from the lists 402, 403, 404, ... and 405 is attached.

With such list structure, the thumbnail information can be easily added and deleted. When a new thumbnail frame is added, the frame numbers are checked in order. Then, the thumbnail information is added so as not to reverse the frame numbers in scale. When a thumbnail frame is deleted, the corresponding thumbnail information may be removed from a list.

Thus, the thumbnail information 201 is managed as a list structure, thereby facilitating addition and deletion because the thumbnail frames are considered to be not only first determined, but often added later. For example, after the I picture of the video data compressed by MPEG-2 has been registered as a thumbnail frame, there will occur a case in which an attempt is made to detect a scene change position of the MPEG-2 compressed video and register a frame of the scene change position as a thumbnail frame. In this case, the thumbnail frames from the I pictures described previously are registered as a reduced image including only a DC component. A thumbnail frame of the scene change position is an important frame, and thus, can be registered as a full-size image frame.

Another description example of thumbnail frame will be described later.

Figure 5:
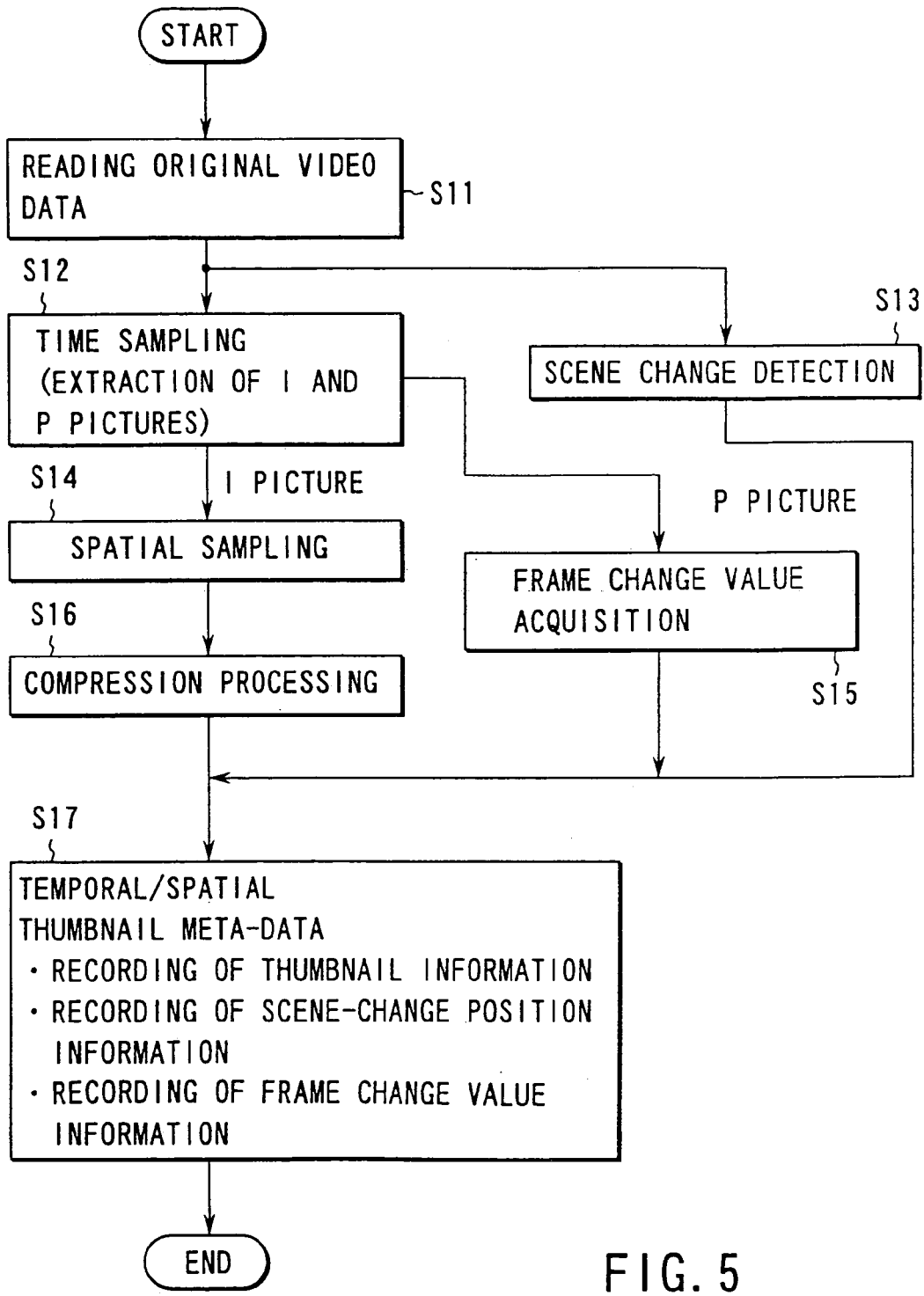
FIG. 5 is a flowchart showing the procedure for recording temporal/spatial thumbnail meta-data for illustrating the procedure for describing the thumbnail information.

Now, the specific procedure for a describing method of the thumbnail information 201 will be described with reference to FIG. 5 by way of exemplifying a case in which the original video data 101 is video data compressed by MPEG-2. FIG. 5 is a flowchart showing the procedure for recording the temporal/spatial thumbnail meta-data 102 including a description of the thumbnail information 201.

First, the video frames of the original video data 101 are read (step S11), and the original video frames are sampled with respect to time (step S12). A scene change position of the original video data is detected (step S13). For the scene change position, a frame change value between adjacent frames of the read original video data 101, for example, is calculated, and is detected as a scene change position where a change occurs by a certain value or more.

Temporal sampling of the original image data 101 in step S12 can be done finely in frames including a large motion, for example, and can be done coarsely in frames including a small motion. In this example, the original video data 101 is video data compressed by MPEG-2, and thus, the I pictures are extracted to create thumbnail frames in step S12, and the P pictures are extracted to detect a frame change value.

Next, the I picture extracted in step S12 is sampled spatially, and one thumbnail frame is created (step S14). More specifically, in step S14, the pixels of the I picture is decimated, and a thumbnail frame including a reduced image is created. Provided if the I picture is an important frame such as scene change position, the original video data frame is handled as a thumbnail frame without decimation, or the thumbnail frame may be occasionally created by performing expansion using pixel interpolation.

On the other hand, the information on a frame change value, namely the information on degree of change of an image between the adjacent frames is acquired from the P picture extracted in step S12 (step S15). The information on a motion vector from a previous frame is added as subsidiary information in the P picture, and thus, a frame change value can be obtained from the size or distribution of the motion vectors.

Next, the thumbnail frames created in step S14 are compressed and processed as required (step S16); the compressed thumbnail frames, a scene change position detected in step S13, and information on the frame change value acquired in step S15 are employed, thereby recording the temporal/spatial thumbnail meta-data 102 as shown in FIGS. 2 and 3 (step S17), and processing terminates.

That is, in step S17, three items of information, i.e., thumbnail information 201, scene change position information 202, and frame change value information 203 are recorded as temporal/spatial thumbnail meta-data 102, as shown in FIG. 2. In addition, the thumbnail information 201, as shown in FIG. 3, contains: (1) frame number or time of original video data corresponding to the thumbnail frame; (2) size (height×width) of the thumbnail frame; (3) the number of frames of the original video data or time until the next thumbnail frame; (4) image format of the thumbnail such as JPEG, RGB, or YUV; and (5) image data of the thumbnail (or pointer for the original video data 101). In this example, the image data of the thumbnail frame shown in (5) is image data of the I picture extracted in step S12; spatially sampled in step S14; and compressed and processed in step S16 as required or not compressed or processed.

Now, how to use the thus recorded temporal/spatial thumbnail meta-data 102 will be described.

(1) Retrieval of the Thumbnail Frame Employing Scene Change Position Information In the case where a predetermined video frame is displayed, when an attempt is made to directly retrieve the predetermined video frame from the original video data 101, a long processing time is required as described previously. Instead, when a predetermined frame is retrieved by retrieving the temporal/spatial thumbnail meta-data 102 obtained by sampling original video data, whereby a processing time is shortened. However, the thumbnail frames are sampled with respect to time, and thus, a predetermined frame image is not always included therein. Thus, it is the easiest way to retrieve and display a thumbnail frame that is the closest to a predetermined frame with respect to time. In FIG. 2, there is shown an example when a thumbnail frame of the thumbnail information $201_n$ that is the closest to a predetermined frame indicated by broken line with respect to time is defined as a display image frame.

In this case, a deviation between the predetermined frame and a display image frame is determined depending on an sampling interval with which the thumbnail frames are created. This deviation is small if the thumbnail frames are time-sampled with sufficiently short intervals, and thus, there is almost no problem. However, if a scene change occurs, the thumbnail frame that is the closest to the predetermined frame with respect to time is not always proper as a display image frame. That is, if a scene change occurs between the predetermined frame and the thumbnail frame contained in the thumbnail information $201_n$ that is the closest thereto, a thumbnail frame contained in the thumbnail information $201_{n-1}$ immediately before the thumbnail information $201_n$ is more proper as the display image frame. According to the present embodiment, as shown in FIG. 2, scene change position information 202 is added as additional information to the temporal/spatial thumbnail meta-data 102, thereby making it possible to solve this problem.

Figure 6:
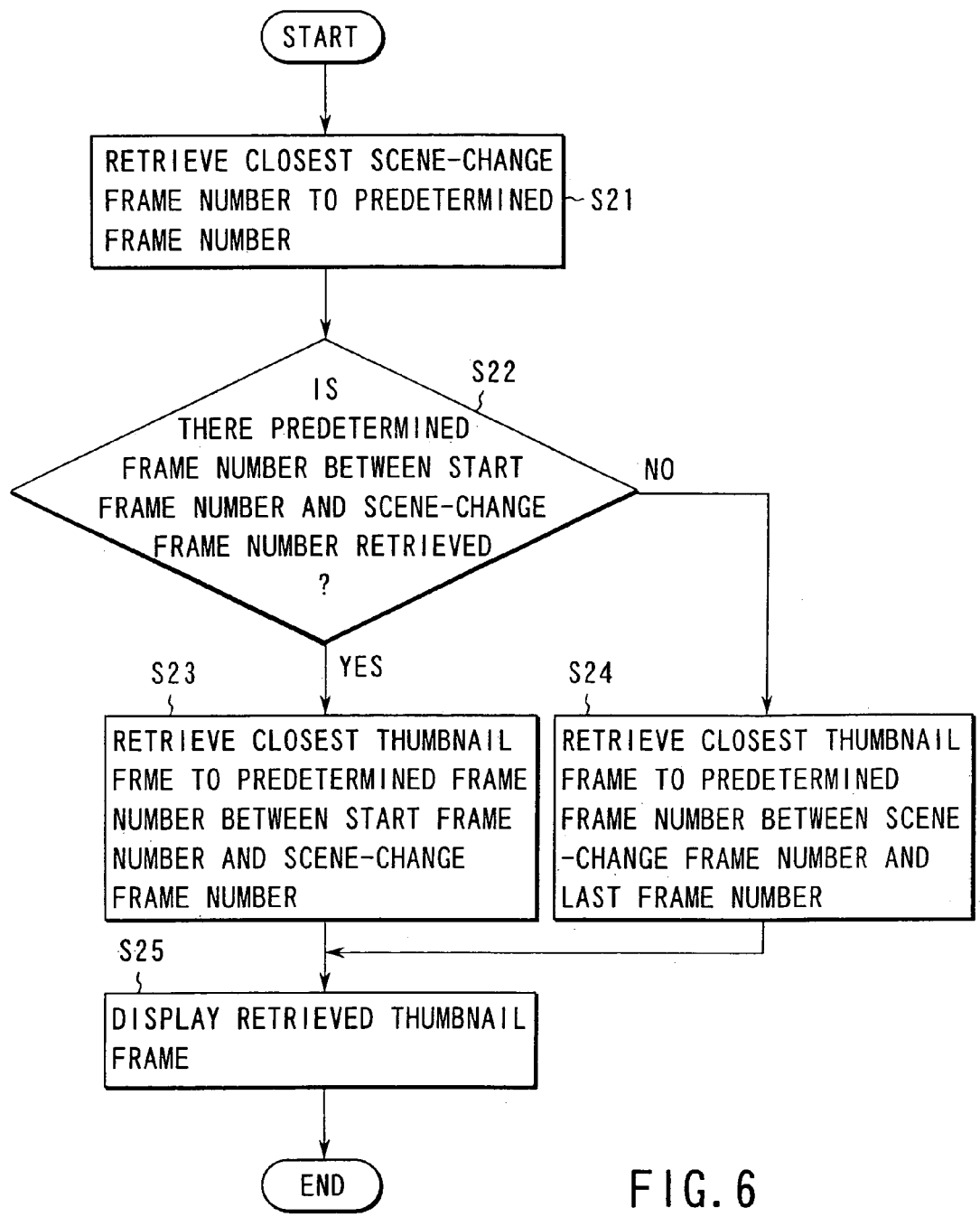
FIG. 6 is a flowchart showing the procedure for retrieving the thumbnail using scene change information contained in the temporal/spatial thumbnail meta-data.

Referring now to the flowchart shown in FIG. 6, the procedure for retrieving a thumbnail frame representative of a predetermined frame by employing the scene change information 202 as described above will be described. Here, the scene change information 202 is represented by a frame number of a scene change position of the original video data (called a scene change frame number).

First, when a frame number of a predetermined frame to be retrieved is assigned, a scene change frame number that is the closest to the frame number is retrieved (step S21).

Next, it is determined whether the predetermined frame number exists from the start frame number of the original video data to the scene change frame number retrieved in step S21. (step S22).

As a result of determination in step S22, when it is found that the predetermined frame number is between the start frame number and the scene change frame number, a thumbnail frame that is the closest to the predetermined frame number with respect to time (or spatially) is retrieved between the start frame number and the scene change frame number (step S23).

As a result of determination in step S22, when it is not found that the predetermined frame number is not between the start frame number and the scene change frame number, a thumbnail frame that is the closest to the predetermined frame number with respect to time (or spatially) is retrieved between the screen change frame number and the last change frame number of the original video data (step S24).

Then, the retrieved thumbnail frame is displayed as an image that is the most similar to the predetermined frame (step S25), and processing terminates.

(2) Thumbnail Retrieval

Figure 7:
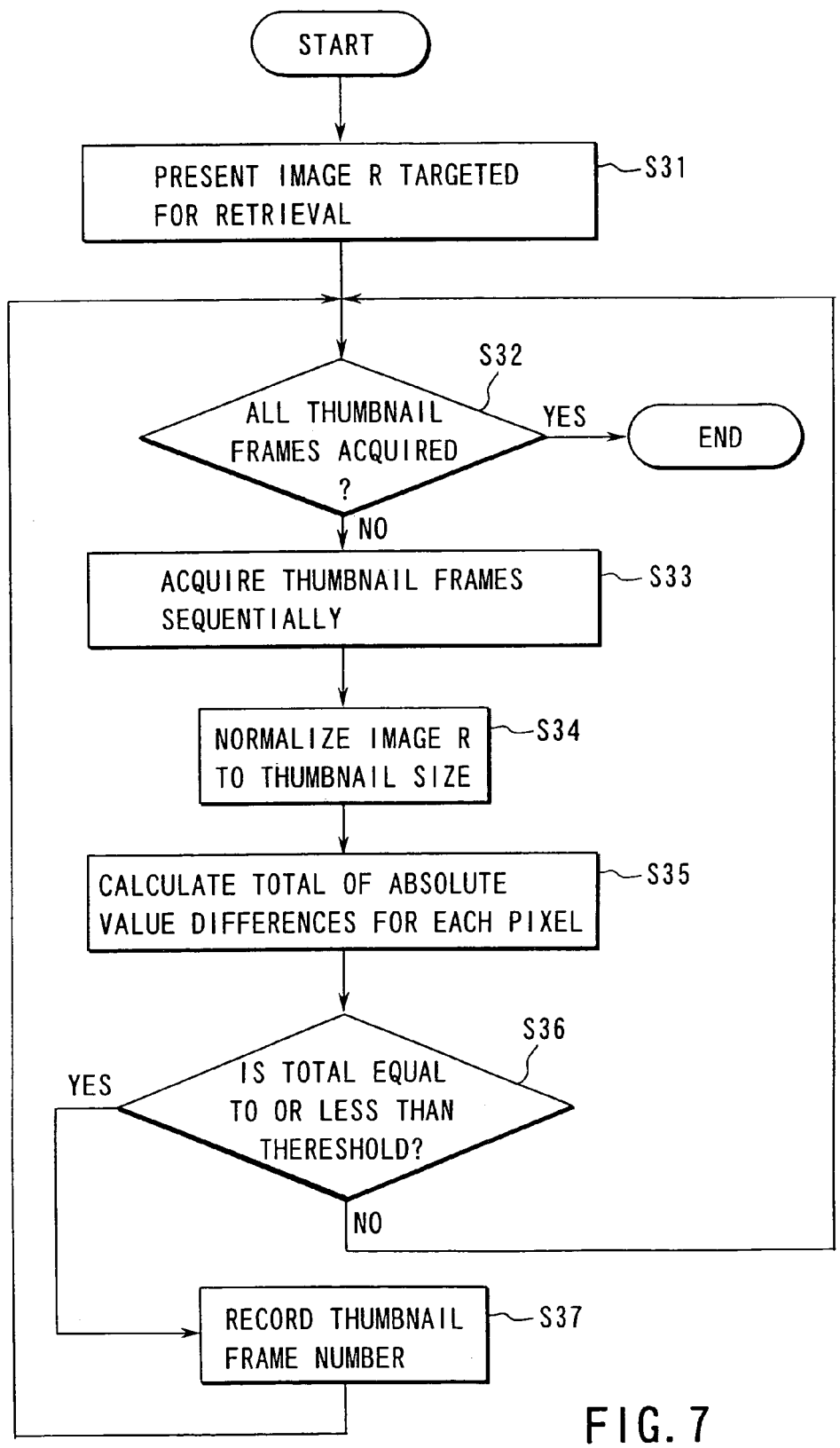
FIG. 7 is a flowchart showing the procedure for retrieving the thumbnail based on the temporal/spatial thumbnail meta-data.

Referring now to the flowchart shown in FIG. 7, the procedure for retrieving an image similar to an image based on temporal/spatial thumbnail meta-data 102 will be described.

First, an image R targeted for retrieval, i.e., an image to be retrieved is presented (step S31).

Next, the thumbnail frames are acquired in order one by one from the temporal/spatial thumbnail meta-data 102 (step S33).

The image R targeted for retrieval is normalized to size of the thumbnail frame acquired in step S33 (step S34). This is because the thumbnail frames are different from each other in size.

The degree of similarity between a thumbnail frame acquired in step S33 and the image R targeted for retrieval normalized in step S34, for example, a total of absolute value differences for each pixel is calculated (step S35).

It is determined whether a total of these absolute value differences is equal or less than a predetermined threshold (step S36). As a result of determination in step S36, if a total of the absolute value differences is equal to or less than the threshold, it is determined that the thumbnail frame acquired in step S33 is almost identical to the image R targeted for retrieval, and the frame number of the thumbnail frame is recorded as the result of retrieval (step S37).

A series of the above processes is repeated until all the thumbnail frames have been obtained in step S32, and processing terminates.

After processing has terminated in accordance with the procedure shown in the flowchart of FIG. 7, the retrieval result is displayed as follows:

The retrieved thumbnail frame is displayed on the display device 107 by means of the thumbnail retrieval/display engine 105 in FIG. 1, based on the frame number of the thumbnail frame obtained as the result of retrieval in step S37.

Alternatively, when an attempt is made to reproduce the original video data 101 at a position of the frame number based on the frame number of the thumbnail frame obtained as the result of retrieval in step S37, the correspondence table 103 shown in FIG. 1 (or a correspondence function table) is employed, thereby to check the frame number of the original video data 101 corresponding to the frame number of the retrieved thumbnail frame. Then, the frame number information and display command are sent to the controller 106, whereby reproduction is performed from the frame of the original video data 101 by employing the video display engine 104, and the data is displayed on the display device 107.

(3) Variable Speed Reproduction Employing Temporal/Spatial Thumbnail Meta-Data

As shown in FIG. 2, in the present embodiment, with respect to the temporal/spatial sampled video meta-data 102, the scene position information 202 and the frame change value information 203 are described as the additional information other than the thumbnail information 201.

The frame change value information 203 is information indicative of a frame change value two video frames in the original video data 101. For example, when a total of absolute-value differences between frames is employed or when the original video data 101 is video data compressed by MPEG, an average (an average power) of the scale of the motion vector of the entire screen can be calculated and obtained from data on motion compensation between the frames. Such frame change value information 203 is added to the temporal/spatial sampled video meta-data 102, thereby making it possible to perform advanced variable speed reproduction.

As described in a video reproducing apparatus of Japanese Patent KOKAI Publication No. 10-243351 (Japanese Patent Application No. 09-042637), there is known a technique wherein video is reproduced slowly where a screen change is large, and is reproduced fast where a screen change is small, thereby achieving variable speed reproduction that is easy to see by making a frame change value constant. This patent assumed that a screen change exists by each frame, and all of the frames are employed. Unlike the present invention, there is not mentioned a case in which discrete thumbnail frames with respect to time is targeted for processing, and a frame change value can also be obtained discretely with respect to time. In the present invention, there is provided a method capable of achieving variable speed reproduction in which a similar effect is obtained with respect to the discrete thumbnail frames with respect to time and a frame change value.

Figure 8:
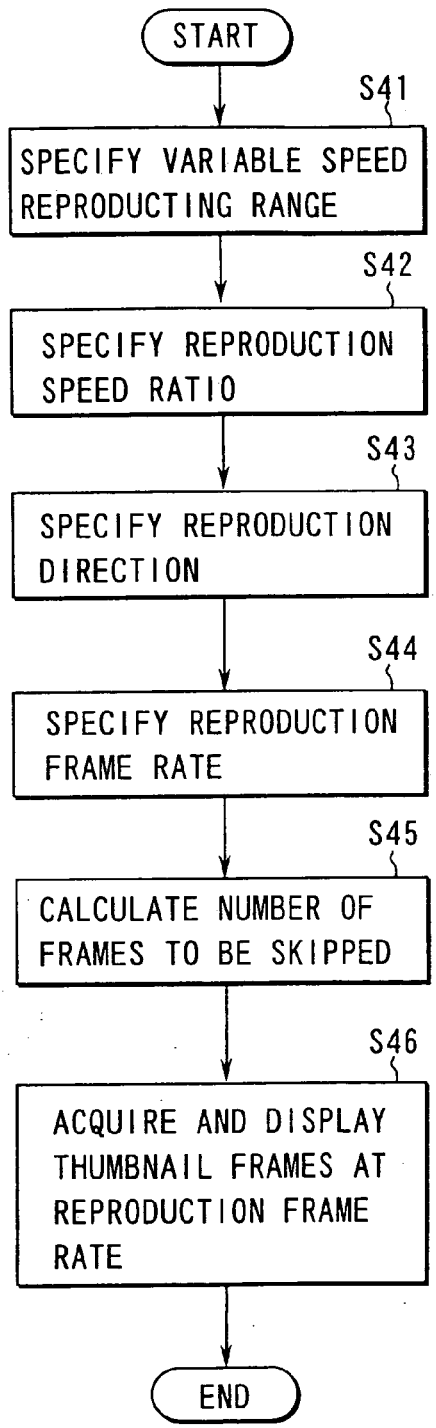
FIG. 8 is a flowchart showing the procedure for a variable speed reproduction using the thumbnails.

Now, the basic procedures for performing variable speed reproduction employing thumbnail frames will be described, referring to the flowchart shown in FIG. 8.

First, a range of performing variable speed reproduction (fast reproduction) is specified (step S41). A start frame number of the variable speed reproduction range is designated by Fs, and an end frame number is designated by Fe.

Next, a reproduction speed ratio 'm', is specified. That is, it is specified as to how fast the reproduction is performed (step S42).

Then, a reproduction direction is specified. Namely, it is specified as to whether reproduction is performed in forward or backward direction (step S43).

Further, a reproduction frame rate 'r' [frames/second] of thumbnail frames is specified (step S44). The reproduction frame rate 'r' differs depending on a television system. For example, in the case of NTSC, the rate is 30 [frames/second]; and in the case of PAL, the rate is 24 [frames/second].

If a frame rate of the original video data 101 is R [frames/second], the number of frames to be skipped with respect to the thumbnail frames is calculated based on the above frame rate on variable speed reproduction, as described later (step S45).

In order to performing thumbnail reproduction at a reproduction frame rate of 'r' [frames/second], the thumbnail frames are acquired and displayed at a cycle of 1/r seconds (step S46.).

In the case of forward reproduction, reproduction is started from the thumbnail frame number corresponding to the frame 'Fs', and the frame numbers are skipped in ascending order. In the case of backward reproduction, reproduction is started from the thumbnail frame corresponding to the frame 'Fe', and the frame numbers are skipped in descending order.

Hereinafter, the processing in step S46 will be described in more detail. In the case of forward reproduction, the thumbnail frames are acquired while the frame numbers per cycle are increased by (m×R/r) frames. That is, the (m×R/r) designates the number of frames to be skipped in forward direction calculated in step S45. In step S46, the closest thumbnail frame in frame number indicative of Fs+(m×R/r)×t is reproduced and displayed, wherein 't' designates the number of cycles.

Similarly, in the case of backward reproduction, the thumbnail frames are acquired while the frame numbers are decreased by (m×R/r) frames. That is, the (m×R/r) designates the number of frames to be skipped in backward direction calculated in step S45. In step S46, the closest thumbnail frame in frame number indicative of Fe−(m×R/r)×× t are reproduced and displayed.

In this manner, it becomes possible to perform variable speed reproduction at an arbitrary reproduction speed ratio employing the thumbnail frames. When there is no difference in thumbnail frames to be inputted at each cycle, the same frame may be continuously displayed, thereby making it possible to improve processing efficiency.

In the foregoing description, it has been assumed that the reproduction speed ratio 'm' is constant as long as the user change it. Now, a method for performing smoother variable speed reproduction will be described by utilizing the aforementioned frame change value information 203. This variable speed reproduction is based on a principle that a reproduction speed during variable speed reproduction employing the thumbnail frames is changed with time according to the frame change value information 203. For the purpose of clarification of a description, it is considered that fast reproduction is performed for the entire original video data 101 without particularly specifying a range of variable speed reproduction.

First, parameters are defined as follows:
A total number of frames on original video data 101: K [frames]
Frame rate of original video data 101: R [frames/second]
Reproduction frame rate of thumbnail frame: r [frames/second]
Reproduction speed ratio: m
Frame change value information: Pi (i=0, . . . , n)
Weight to be imparted to reproduction speed corresponding to thumbnail frame: Wi
Frame number of original video data corresponding to thumbnail frame: Fi (i=0, . . . , n−1)
weight to be imparted to reproduction speed corresponding to each frame of original video data: Wj (j=0, . . . , K−1)

Now, a limit of a frame change value of a thumbnail frame imparted to active movement is designated by 'L', and a value that does not exceed a limit 'L' is designated by [Pi].

[Pi]=L, when Pi>L

[Pi]=Pi, when Pi≦L    (1)

In addition, a weight imparted to a reproduction speed corresponding to a frame change value is designated by wi=[Pi].

Next, consider a weight for the reproduction speed of each frame. A weight Wi corresponding to the discrete reproduction speed is linearly interpolated, and the Wj shown below is obtained.

$Wj=Wi+(W(i+1)-Wi)/(F(i+1)-Fi) \times t$ where $t=0, \ldots, F(i+1)-Fi,$ $j=Fi, \ldots, F(i+1)-1,$ $i=0, \ldots, n-1$    (2)

Assuming that W'j is obtained by normalizing Wj so that a total summation is 1.0, the following is obtained:

$W'j=Wj/\Sigma Wj$ where j=0, . . . , k    (3)

The display count N required for reproduction at a reproduction speed ratio 'm' and at a reproduction frame rate 'r' [frames/second] is obtained by the formula below.

$N=K/(m \times R/r)$    (4)

When a display image frame is acquired from the thumbnail frames in consideration of a weight imparted to the reproduction speed, the weight W'j allocated for each thumbnail frame is added, and the thumbnail frame is acquired when the addition value exceeds a threshold of Th=p/N (p=0, . . . , N−1). That is, the closest thumbnail frame corresponding to the frame number when the addition value exceeds the threshold 'Th' becomes a display image frame.

If the display image frames are acquired in advance according to the above calculation, and are displayed at a frame rate of 'r' [frames/seconds], the video is displayed at a slow speed when the quantity is great and at a fast speed when the quantity is small. As a result, an image can be displayed at a predetermined reproduction speed ratio 'm'. When the above calculation is employed, it is possible to reproduce a video program of a certain time length within an arbitrary shorter time. Smoothing is applied to the weight w'j applied to the reproduction speed, and special weighting is performed during scene change or at a still image portion, thereby making it possible to further add a special effect to variable speed reproduction.

Here, a case in which variable speed reproduction is performed for the entire original video data 101 has been described. However, variable speed reproduction can be performed in the entire similar manner as that in partial reproduction. That is, when W'j of the entire original video data 101 can be calculated, a partial reproduction can be easily performed. In addition, in the description of a case of variable speed reproduction for the entire original video data 101, it is assumed that frame change value information exists at the start and end frames of variable speed reproduction. Otherwise, the frame change value information at a properly close frame is used or a default value is given, thereby performing calculation.

Figure 9:
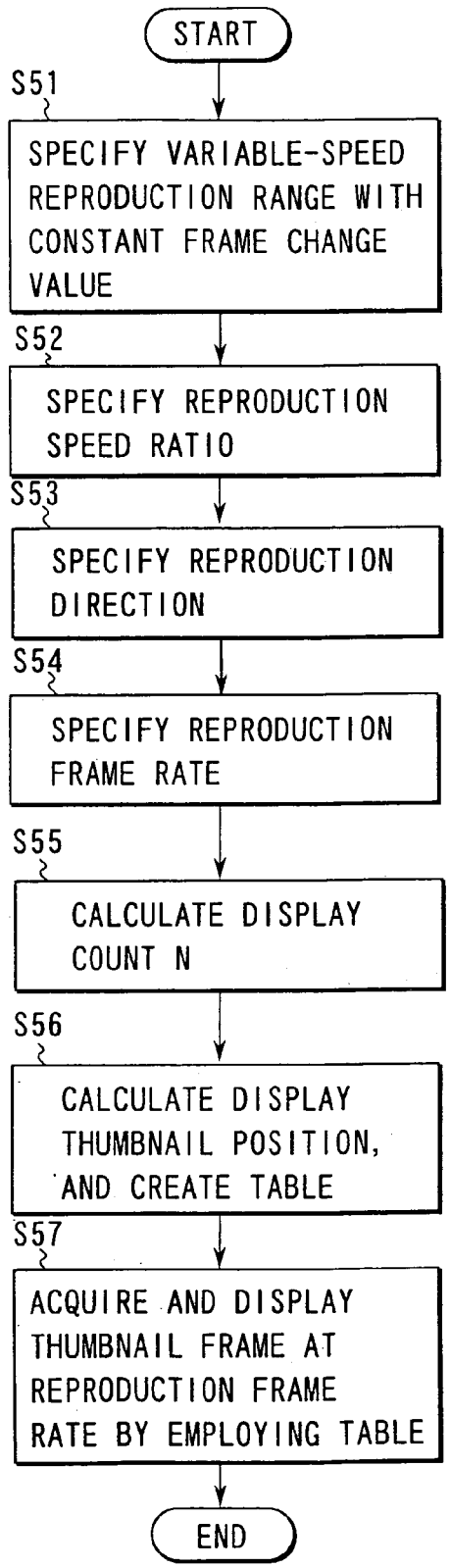
FIG. 9 is a flowchart showing the procedure for a smooth variable speed reproduction using the thumbnails and frame change value information.

Hereinafter, referring now to the flowchart shown in FIG. 9, a specific processing procedure for performing smoother variable speed reproduction will be described by utilizing the frame change value information 203 as described above. In FIG. 9, the processing in steps S51 to S54 is basically similar to that in steps S41 to S44 shown in FIG. 8.

That is, a range for variable speed reproduction (rapid reproduction in this case) with the constant frame change value is specified (step S51). The start frame of the variable speed reproduction range is defined as 'Fs', and the end frame is defined as 'Fe'. Next, a reproduction speed ratio "m" is specified. That is, it is specified as to how fast the reproduction is performed (step S52). Next, a reproduction direction is specified. Namely, it is specified as to whether fast reproduction is performed in forward or backward direction (step S53). Then, a reproduction frame rate 'r' [frames/second] of the thumbnail frames is specified (step S54).

Thereafter, the required display count N is calculated by the formula (4) (step S55). A position of the thumbnail frame when an addition value of W'j shown in the formula (4)

exceeds a threshold value of Th=p/N (p=0, . . . , N−1), namely, the closest thumbnail frame corresponding to the frame number when the addition value exceeds the threshold 'Th' is calculated as a display image frame position, and the calculated position is recorded in a table (step S56).

In order to reproduce and display thumbnail frames at a reproduction frame rate 'r' [frames/second], a display thumbnail frame is acquired and displayed by employing the above table at a cycle of 1/r second (step S57).

When the thumbnail frame is thus employed to perform variable speed reproduction, a reproduction speed is changed according to the frame change value. Namely, the reproduction speed is made slow where the frame change value is great, and is made fast where the frame change value is small, whereby variable speed reproduction in which the frame change value is constant similar to "a video reproducing apparatus" disclosed in Japanese Patent KOKAI Publication No. 10-243351 (Japanese Patent Application No. 09-042637) can be achieved for the thumbnail frame.

(4) Other Application Aspect

Figure 10:
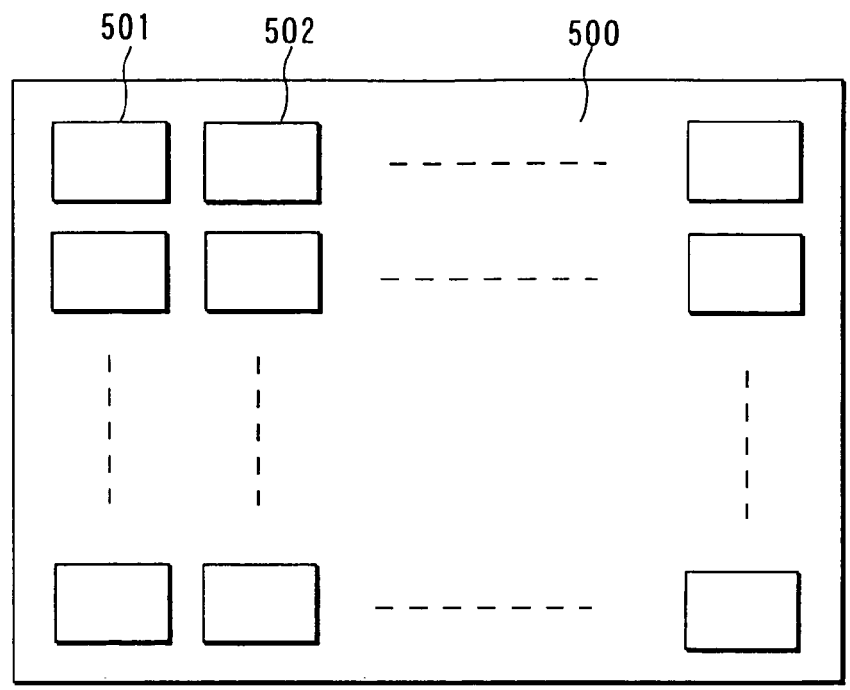
FIG. 10 is a view showing an example of listing thumbnails using the scene change information contained in the temporal/spatial thumbnail meta-data.

FIG. 10 is an example listing the closest thumbnail frames 501, 502, . . . to a scene change position (cut point) selected by a method described above. Such listing screen 500 can be created at a high speed because an image frame is not inputted from the original image data.

Figure 11:
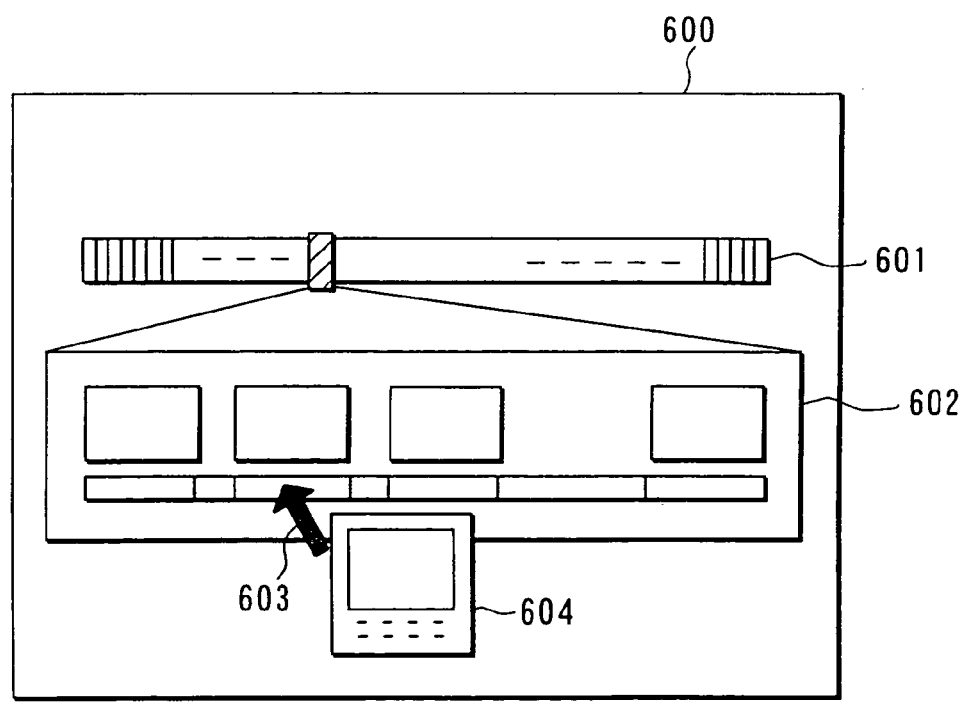
FIG. 11 is a view showing an example of displaying original video data and thumbnails using the temporal/spatial thumbnail meta-data.

FIG. 11 is an example in which the entire original video is displayed by one bar 601, and further, is displayed by a bar 602 in which a specified range of the bar 601 is enlarged. At the enlarged bar 602, an image of a frame of the cut point included in the original video at this range is displayed as heading. When a mouse cursor 603 is applied onto the enlarged bar 602, the most similar close thumbnail frame 604 to the image frame at the mouse cursor 603 is selected in consideration of a position of the cut point, and can be displayed as an icon. Since this processing can be performed at a high speed, a mouse icon is horizontally slid, thereby making it possible to display an icon image in real time as if it were a moving image.

On the other hand, when application of a monitoring system is considered, there is a request for efficiently finding out a less frequent event. For example, only a background image is always displayed on the monitoring screen. Assume that an invader is displayed at a certain time. Such invader can be easily found as a difference image of the background image. In addition, the video is recorded, and at the same time, a thumbnail frame is sampled coarsely with regard to time where no change occurs on the screen, and is time-sampled finely with regard to time where a change occurs on the screen, thereby making it possible to reliably record the invader. Information for management of cut points or the like is stored as the additional information on the screen on which the invader is displayed, making it possible to display a list later. In addition, only when the invader is found, spatial sampling of a thumbnail frame is fined, thereby making it possible to check an invader even in the thumbnail frames.

Further, it is effective to acquire a still image with its higher resolution than an original video when the invader has invaded, and to manage it as the thumbnail frame. When the resolution is insufficient in a general video, it is possible to discriminate the invader by employing a still image with its higher resolution than the original image.

As has been described above, according to the present embodiment, thumbnail information including the thumbnail frames obtained by sampling the original video frames other than the original video data with arbitrary time intervals and in an arbitrary spatial size and the attribute information is recorded in advance, and the thumbnail information other than the original video data is retrieved, thereby making it possible to easily perform video retrieval for a predetermined frame without any burden on a computer power or traffic. In addition, the scene change position information is added to the thumbnail information as the additional information, thereby making it possible to retrieve a thumbnail frame more similar to the predetermined frame. Further, a difference between a predetermined image targeted for retrieval and the image of each thumbnail frame, for example, a total of absolute value differences is obtained, and a thumbnail frame whose total of absolute value differences is small is retrieved, thereby making it possible to retrieve the predetermined image. Furthermore, the reproduction speed is made slow where a frame change value is great, and the reproduction speed is made fast where the frame change value is small, thereby making it possible to achieve a variable speed reproduction for the thumbnail frame which is easy to see and has the frame change value constantly maintained.

Other embodiments of the video retrieval system according to the present invention will be described. The same portions as those of the first embodiment will be indicated in the same reference numerals and their detailed description will be omitted.

Second Embodiment

In the first embodiment, the temporal/spatial thumbnail meta-data 102 is assumed to have a plurality of thumbnail information $201_1$ to $201_n$. A description example thereof was not described in detail. The second embodiment concerning this specific description example will be described below.

Figure 12:
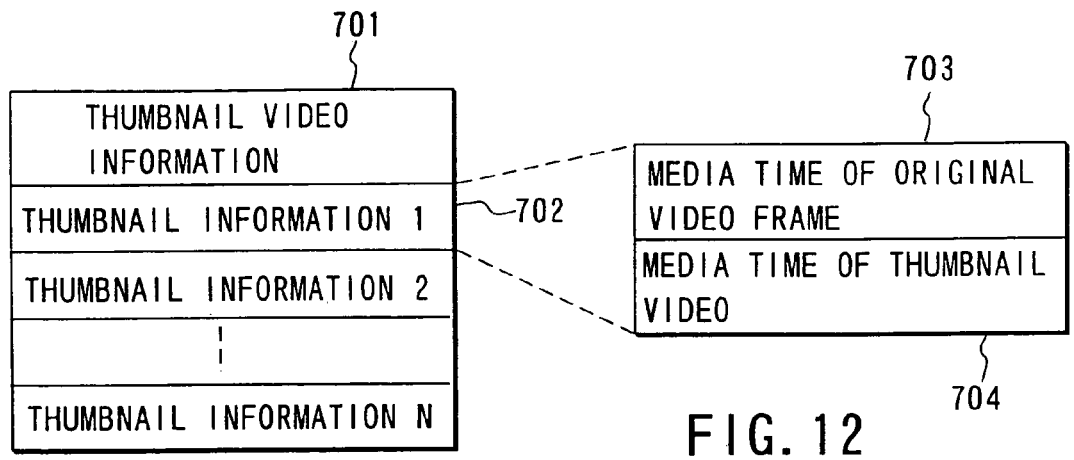
FIG. 12 is a view showing another description example of the thumbnail information.

FIG. 12 shows a description example of thumbnail information of the second embodiment. In the figure, a group of the thumbnail frames are handled as one video (thumbnail video), and thumbnail video information 701 is configured as a set of the thumbnail information. A thumbnail video other than the thumbnail video information 701 is provided, its site may be described in the thumbnail video information 701 by URL or the like, and the thumbnail video may be described directly as the thumbnail video information 701.

Thumbnail information 702 indicates a correspondence between the thumbnail frame in the thumbnail video indicated by the thumbnail video information 701 and the original video data frame, and is described in plurality according to the number of thumbnail frames contained in the thumbnail video. The thumbnail information 702 includes a media time 703 of the original video frame and a media time 704 of the thumbnail video. The media time 703 of the original video frame indicates the original video frame corresponding to the thumbnail frame. If the original video frame can be uniquely determined, it may be time such as a time stamp or a frame number or the like. In addition, in the case where a corresponding original video frame is obtained by calculation, for example, in the case where original video frames are sampled with constant intervals, information (for example, sampling intervals) required for calculation is described, whereby the media time 703 of the original video frame may be omitted. The media time 704 of the thumbnail video indicates a specific thumbnail frame in the thumbnail video indicated by the thumbnail video information 701. If the thumbnail frame can be uniquely determined, the media time 704 of the thumbnail may be a frame number or the like. If the thumbnail video is handled as a general video, it may be a time such as time stamp. In addition, when correspondence with the thumbnail video is performed sequentially, it may be omitted.

Figure 13:
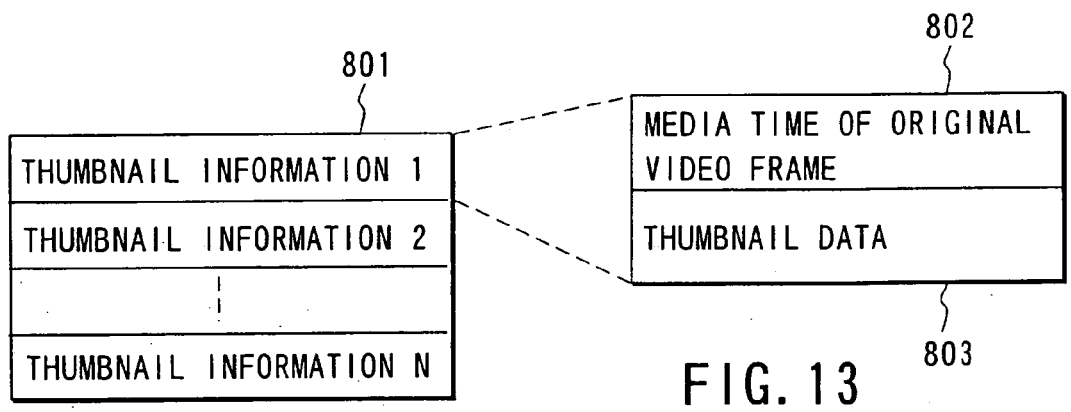
FIG. 13 is a view showing another description example of the thumbnail information.

FIG. 13 shows another description example of thumbnail information. Thumbnail information 801 presents a correspondence between each thumbnail frame and the original video data frame, and is described in plurality according to the number of thumbnail frames. The thumbnail information 801 includes a media time 802 of the original video frame and thumbnail data 803. The media time 802 indicates a frame position of the original video data corresponding to the thumbnail frame, similar to the media time 703 in the description example shown in FIG. 12. This media time 802 may be omitted in a manner similar to that in the media time 703. Thumbnail frames other than thumbnail data 803 are individually provided, whereby its site may be described by URL or the like, and the thumbnail frames are directly described as thumbnail data in the thumbnail data 803. In addition, instead of the thumbnail, another image such as illustration indicative of its content may be employed as thumbnail data.

Figure 14:
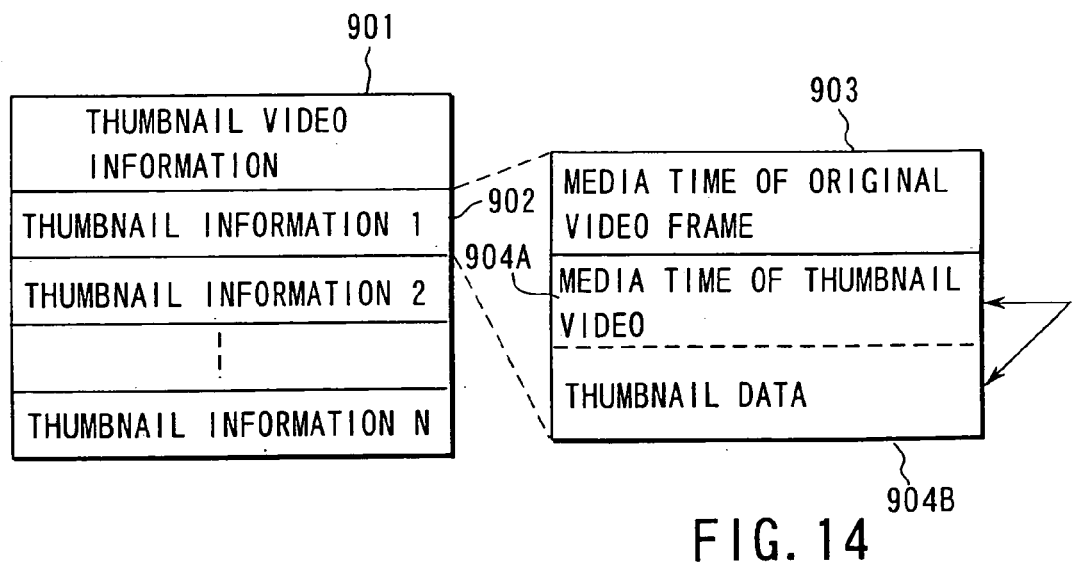
FIG. 14 is a view showing still another description example of the thumbnail information.

FIG. 14 shows another description example of thumbnail information. Such another description example shown in FIG. 14 includes both of the description examples shown in FIGS. 12 and 13. Thumbnail video information 901 is similar to the thumbnail video information 701 in the description example shown in FIG. 12, and denotes URL indicating a site of this video or a thumbnail video itself. Thumbnail information 902 presents a correspondence between each thumbnail frame and the original video data frame, and is described in plurality according to the number of thumbnail frames. The thumbnail information 902 includes a media time 903 of the original video frame and either of the media time 904A or thumbnail data 904B of the thumbnail video. The media time 903 of the original video frame indicates a frame of the original video data corresponding to the thumbnail frame, similar to the media time 703 in the description example shown in FIG. 12. This media time 903 may be omitted in a manner similar to that in the media time 703. A media time 904A of the thumbnail video is similar to the media time 704 in the description example shown in FIG. 12, and indicates a specific thumbnail frame in the thumbnail video indicated in the thumbnail information 901. If the media time 904A is sequentially associated with the thumbnails, it may be omitted. Thumbnail data 904B is similar to thumbnail data 803 in the description example shown in FIG. 13, and indicates sites of the individual thumbnail frames or a thumbnail frame itself.

According to the description example shown in FIG. 14, a part of the thumbnail video can be replaced with another, or another thumbnail can be added.

Figure 15:
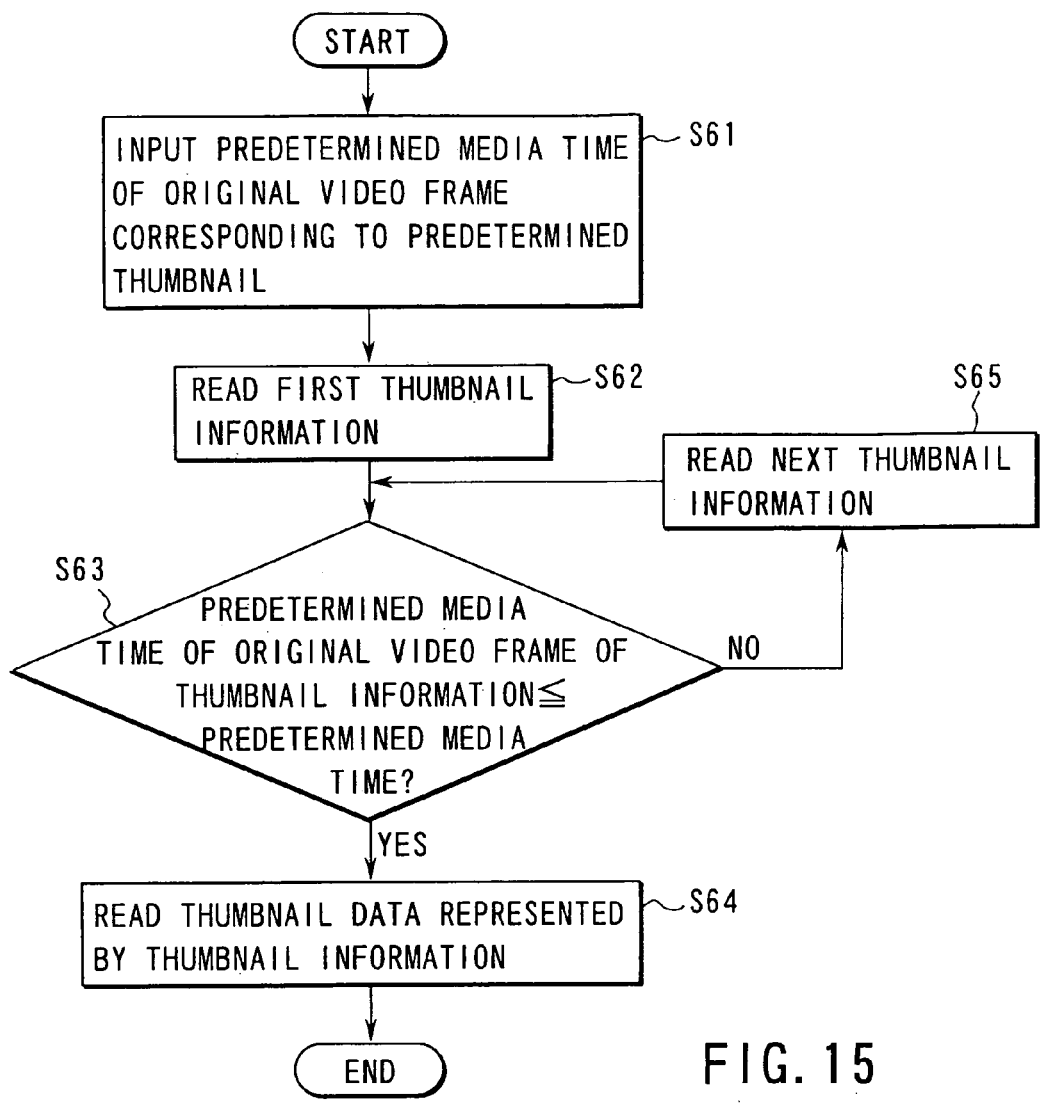
FIG. 15 is a flowchart showing retrieval of the thumbnail data using the thumbnail information according to the description examples shown in FIGS. 12 and 14.

Now, processing for extracting thumbnail data of a predetermined media time will be described by referring to the description examples shown in FIGS. 12 to 14. FIG. 15 is a basic flowchart thereof. In step S61, a predetermined media time of the original video frame corresponding to a predetermined thumbnail frame is inputted. The media time uniquely indicates a time-related position in the media such as time stamp or frame number. In step S62, first thumbnail information is inputted from among the thumbnail information groups described in the description examples shown in FIGS. 12 to 14. In step S63, the predetermined media time is compared with a media time of the original video frame contained in the thumbnail information. If both of them are identical or the predetermined media time is later, the processing goes to step S64, and the thumbnail data indicated in the thumbnail information is inputted. A thumbnail data extraction method differs depending on a describing method. When a thumbnail frame number is described, the corresponding thumbnail data of the thumbnail video is extracted. When the thumbnail data itself is described, the data is employed as is. When a media time contained in the thumbnail information is later than the predetermined media time, the processing goes to step S65. Then, next thumbnail information is inputted from the thumbnail information group, the processing goes to step S63 again, and media time comparison is performed.

Figure 16:
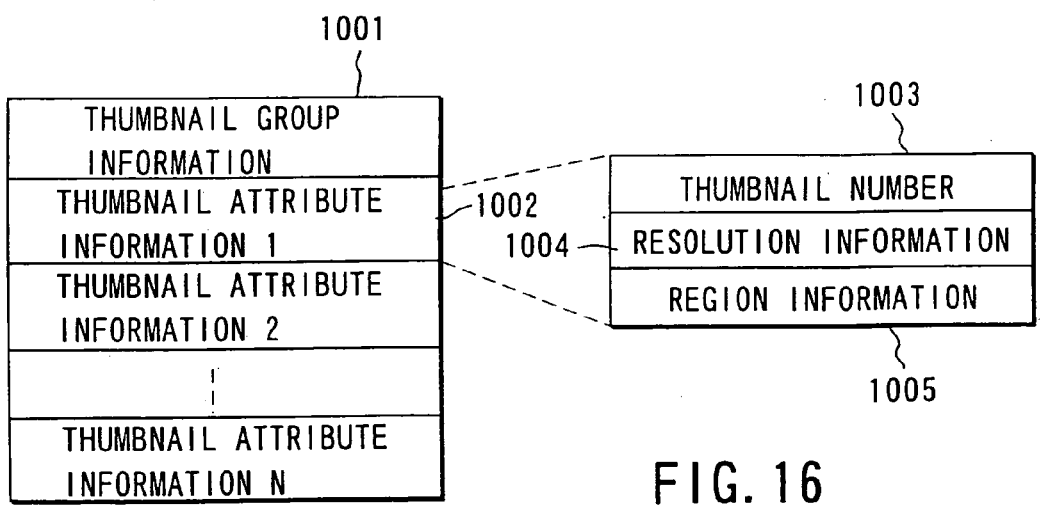
FIG. 16 is a view showing still another description example of the thumbnail information.

FIG. 16 is a description example when the attribute information of a thumbnail frame is added to the description examples shown in FIGS. 12 to 14. A thumbnail video can be employed as a thumbnail by employing thumbnail frames of its difference size or cutting out only a region of part of the original video data. Thus, the description example shown in FIG. 16 is directed to an example of describing these parameters as attribute information.

Thumbnail group information 1001 indicates information in accordance with a description example or the like shown in FIGS. 12 to 14. Thumbnail attribute information 1002 is directed to attribute information of individual thumbnail frames, and is described in plurality according to the number of thumbnail frames contained in a thumbnail video. The thumbnail attribute information 1002 includes thumbnail number 1003, resolution information 1004, and region information 1005.

The thumbnail number 1003 is a number corresponding to a specific thumbnail frame contained in the thumbnail frame group indicated in the thumbnail group information 1001. If the thumbnail frame number 1003 sequentially corresponds to the thumbnail frame in the thumbnail frame group, it may be omitted.

The resolution information 1004 indicates resolution of the original image data corresponding to the thumbnail frame indicated by the thumbnail number 1003. For example, a reduction rate of the image or the like is described.

The region information 1005 indicates the region in a frame of the original video data corresponding to the thumbnail frame indicated by the thumbnail number 1003. When the thumbnail frame cuts out a part of the corresponding frame of the original video data, that region is described as is. When a thumbnail frame is equivalent to the whole corresponding frame of the original video data, the region information may be omitted.

Although not shown here, these items of attribute information may be described in each thumbnail information in description examples shown in FIGS. 12 to 14.

Figure 17:
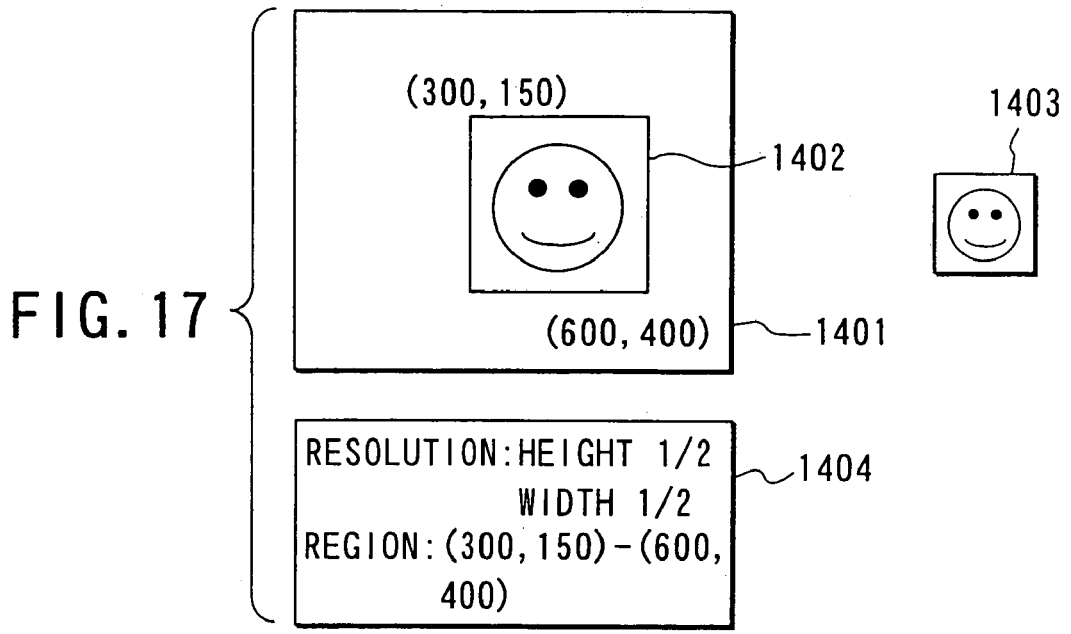
FIG. 17 is a view showing a specific example of the thumbnail information according to the description example shown in FIG. 16.

FIG. 17 is an actual description example when the describing method shown in FIG. 16 is employed. Assume that an object exists in a part of the original video frame 1401. When a thumbnail frame of the original video frame 1401 is created, the thumbnail frame containing more detailed contents of an image can be created by using only a part of the screen and sampling it, rather than sampling the entire screen. A rectangular region 1402 in the original video frame 1401 is selected, sampling is performed so that the height and width are reduced by ½, and a thumbnail frame 1403 is created. At this time, a description example of resolution information and region information is represented by 1404.

Figure 18:
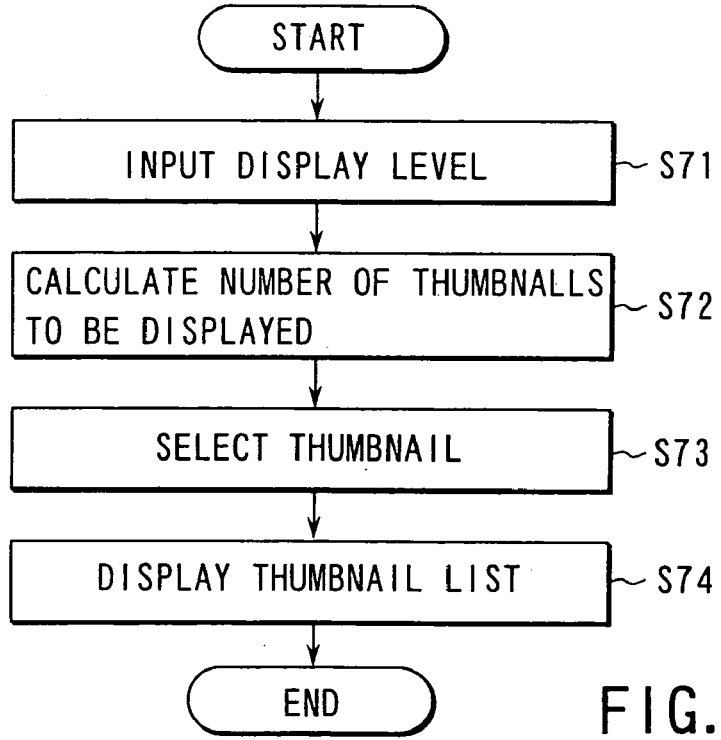
FIG. 18 is a flowchart showing an operation displaying the listing of the thumbnail frames variably in number according to a display level.

FIG. 18 is a basic flowchart when thumbnail frames are listed according to the user request. In step S71, the user inputs a listing level or display level. In this inputting method, GUI such as slider which continuously changes according to the display level may be employed, and numeric data may be directly inputted. Alternatively, an input device such as wheel or dial connected to a computer or the like may be employed.

In step S72, the number of thumbnail frames to be listed from the level value inputted in step S71 is calculated. For example, assume that a maximum display level is designated by Lmax, the maximum number of display thumbnail frames is designated by Tmax, and the current display level is designated by L, the number of display thumbnail frames can be obtained by T=Tmax×L/Lmax.

In step S73, thumbnail frames to be listed are selected according to the number of display thumbnail frames. For example, a thumbnail frame is selected with constant time intervals or constant frame intervals. Alternatively, when additional information such as cut point information is provided, a frame with its higher priority such as a first frame of cut point or scene may be preferentially selected.

In step S74, a list of selected thumbnail frames is created and displayed.

Figure 19:
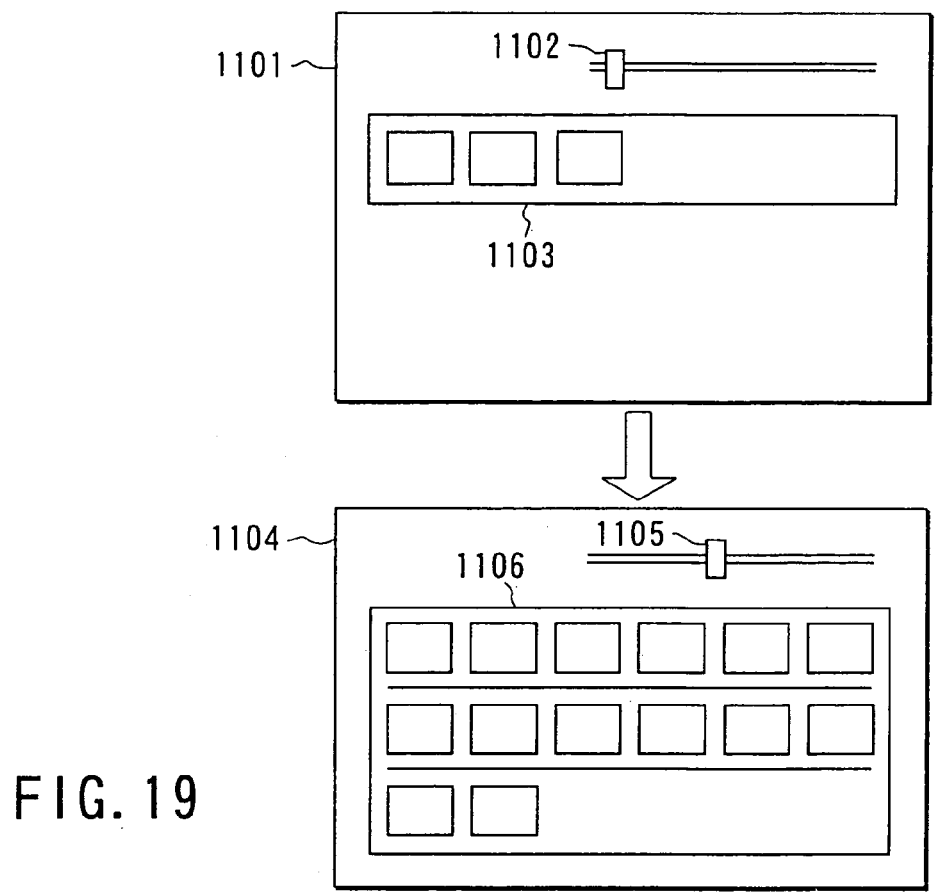
FIG. 19 is a view showing a change of the thumbnail frame listing when the display level is varied.

FIG. 19 shows an interface of the listing of thumbnail frames by employing the basic flowchart shown in FIG. 18. A slider 1102 for specifying a display level and a thumbnail list 1103 exist on a thumbnail list 1101. When the slider 1102 is moved to a position as indicated by a slider 1105 to increase a display level, the number of thumbnail frames to be listed increases as shown in a listing 1106. By employing such interface, the user can display necessary thumbnail frames intuitively according to the contents of video.

Figure 20:
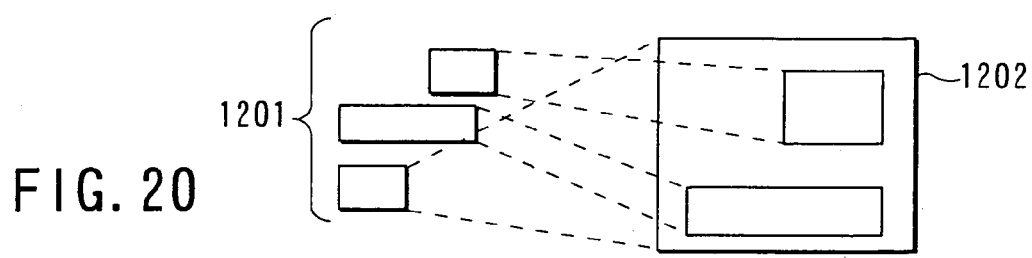
FIG. 20 is a view showing an example when a plurality of thumbnail frames with different resolutions and regions are displayed to be superimposed based on the thumbnail information according to the description example shown in FIG. 16.

FIG. 20 is an example of screen display employing a description example shown in FIG. 16. By employing the description example shown in FIG. 16, a thumbnail frame with its different resolution or a thumbnail frame having only a part of the screen cut out can be handled. On the other hand, a region in which sampling with high resolution is desirable, such as subtitle portion and a region in which sampling with low resolution suffices, such as background coexist in an image. A group of thumbnail frames 1201 including plural thumbnail frames with different resolutions and regions created from the same frame is provided, and these thumbnail frames are displayed to be superimposed as shown in a screen display example 1202, thereby making it possible to display a subtitle with high resolution and a background with a low resolution.

Figure 21:
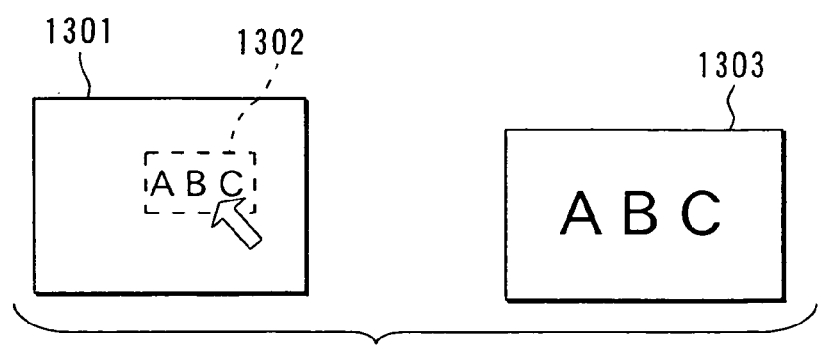
FIG. 21 is a view showing another example when a plurality of thumbnail frames with different resolutions and regions are displayed to be superimposed based on the thumbnail information according to the description example shown in FIG. 16.

FIG. 21 is another example of screen display employing the description example shown in FIG. 16. An image 1301 is a thumbnail frame sampled at a low resolution. When a region 1302 in which the user desires a more detailed image, such as subtitle portion, is pointed out by the mouse or the like, a thumbnail frame 1303 in which only a region 1302 is sampled at a higher resolution is displayed by pop-up or the like. In general, a thumbnail frame with its low resolution, such as image 1301 is displayed. Thus, the size of image can be reduced, and many images can be displayed by listing them or the like.

The present invention is not limited to the above mentioned embodiments, and can be practiced by modifying it variously.

As has been described above, according to the image information describing method of the present invention, the contents of video can be retrieved or displayed while they are confirmed.

In addition, when retrieval is performed based on a thumbnail obtained by sampling original video data, even if a target frame for retrieval exists between a scene change and another scene change, proper video retrieval can be performed.

Further, variable speed reproduction can be performed based on a thumbnail. Thus, a processing quantity can be reduced, and variable speed reproduction can be easily achieved even on a device with its small computer power or on a network.

What is claimed is:

1. An image information describing method describing a thumbnail video file including thumbnail frames, the method comprising:

sampling original video frames included in an original video file with at least one of a variable time interval parameter and a variable size parameter to obtain a thumbnail video file including thumbnail frames;

describing a thumbnail video information locator indicating a site of the thumbnail video file; and describing at least one thumbnail information item indicating a correspondence between a first media time of a thumbnail frame in the thumbnail video data file and a second media time of a corresponding original frame in the original video file.

2. The method according to claim 1, wherein the thumbnail video information locator comprises a URL (uniform resource locator) of the site of the thumbnail video file.

3. The method according to claim 1, wherein the media time of the original frame comprises a time stamp of the original frame.

4. An image information describing method describing a thumbnail video file including thumbnail frames, the method comprising:

sampling original video frames included in an original video file with at least one of a variable time interval parameter and a variable size parameter to obtain a thumbnail video file including thumbnail frames;

describing a thumbnail video information locator indicating a site of the thumbnail video file; and describing at least one thumbnail information item indicating a correspondence between a first frame number of a thumbnail frame in the thumbnail video file and a second frame number of a corresponding original frame in the original video file.

5. The method according to claim 1, wherein the thumbnail information item further comprises a frame number of the thumbnail frame.

6. The method according to claim 1, wherein the media time of the thumbnail file comprises a time stamp of the thumbnail frame.

* * * * *